United States Patent
Chassot et al.

(10) Patent No.: US 9,948,757 B2
(45) Date of Patent: Apr. 17, 2018

(54) FIELD DEVICE

(71) Applicant: Siemens Schweiz AG, Zurich (CH)

(72) Inventors: Adrien Chassot, Lucerne (CH); Christian Fuchs, Baech (CH); Thomas Keller, Horw (CH); Mathias Spielmann, Schenkon (CH)

(73) Assignee: SIEMENS SCHWEIZ AG, Zurich (CH)

( * ) Notice: Subject to any disclaimer, the term of this patent is extended or adjusted under 35 U.S.C. 154(b) by 164 days.

(21) Appl. No.: 14/982,119

(22) Filed: Dec. 29, 2015

(65) Prior Publication Data

US 2016/0205225 A1   Jul. 14, 2016

(30) Foreign Application Priority Data

Jan. 12, 2015 (EP) .................................... 15150800

(51) Int. Cl.
*H04L 12/24* (2006.01)
*H04L 29/08* (2006.01)
*G05B 19/418* (2006.01)

(52) U.S. Cl.
CPC ........ *H04L 69/323* (2013.01); *G05B 19/4186* (2013.01); *H04L 41/22* (2013.01);
(Continued)

(58) Field of Classification Search
None
See application file for complete search history.

(56) References Cited

U.S. PATENT DOCUMENTS

| 8,761,196 B2 | 6/2014 | Law et al. ..................... 370/464 |
| 2012/0014395 A1* | 1/2012 | Komatsu ................ H04L 69/18 370/467 |

(Continued)

FOREIGN PATENT DOCUMENTS

| EP | 2701024 A2 | 2/2014 | ........... G05B 19/418 |

OTHER PUBLICATIONS

Burgstaller, Wolfgang et al., "Gatewayless Communication between LonWorks and BACnet," Factory Communication Systems, 2004 IEEE International Workshop, Vienna, pp. 361-364 (4 pages), 2004.
(Continued)

*Primary Examiner* — Chi H Pham
*Assistant Examiner* — Soon-Dong D Hyun
(74) *Attorney, Agent, or Firm* — Slayden Grubert Beard PLLC

(57) ABSTRACT

A field device of a room automation system or of a power management system or of a hazard detection system is disclosed. The field device includes at least one human-machine interface with at least one memory configured to store physical layer data, at least two protocol stacks, wherein the field device is configured to select at least one protocol stack based on the physical layer data stored in the memory of the human-machine interface. The field device also includes at least two physical layers, at least two pairs, wherein each compatible pair includes at least one physical layer and at least one protocol stack. The field device also includes selector switch(es) configured to connect and to disconnect physical layers and protocol stacks, such that a physical layer element and a protocol stack connected or disconnected by the selector switch(es) belong to the same compatible pair.

13 Claims, 1 Drawing Sheet

(52) U.S. Cl.
CPC .... *H04L 67/36* (2013.01); *G05B 2219/31129* (2013.01); *G05B 2219/31181* (2013.01); *Y02P 90/185* (2015.11)

(56) References Cited

U.S. PATENT DOCUMENTS

| | | | | |
|---|---|---|---|---|
| 2013/0079903 | A1* | 3/2013 | Kemmann | G05B 15/02 700/83 |
| 2014/0277764 | A1* | 9/2014 | Burt | G05B 15/02 700/276 |
| 2015/0145641 | A1* | 5/2015 | Kapinos | G06F 1/3287 340/4.34 |
| 2016/0006290 | A1* | 1/2016 | Ho | H02J 7/0044 320/108 |
| 2016/0054988 | A1* | 2/2016 | Desire | G05B 19/04 717/177 |
| 2016/0234186 | A1* | 8/2016 | Leblond | G06Q 10/06 |

OTHER PUBLICATIONS

Granzer, Wolfgang et al., "Gateway-Free Integration of BACnet and KNX Using Multi-Protocol Devices," The IEEE International Conference on Industrial Informatics, Daejeon, Korea, pp. 973-978 (6 pages), Jul. 13, 2008.

European Search Report, Application No. 15150800.9, 6 pages, dated Jun. 12, 2015.

* cited by examiner

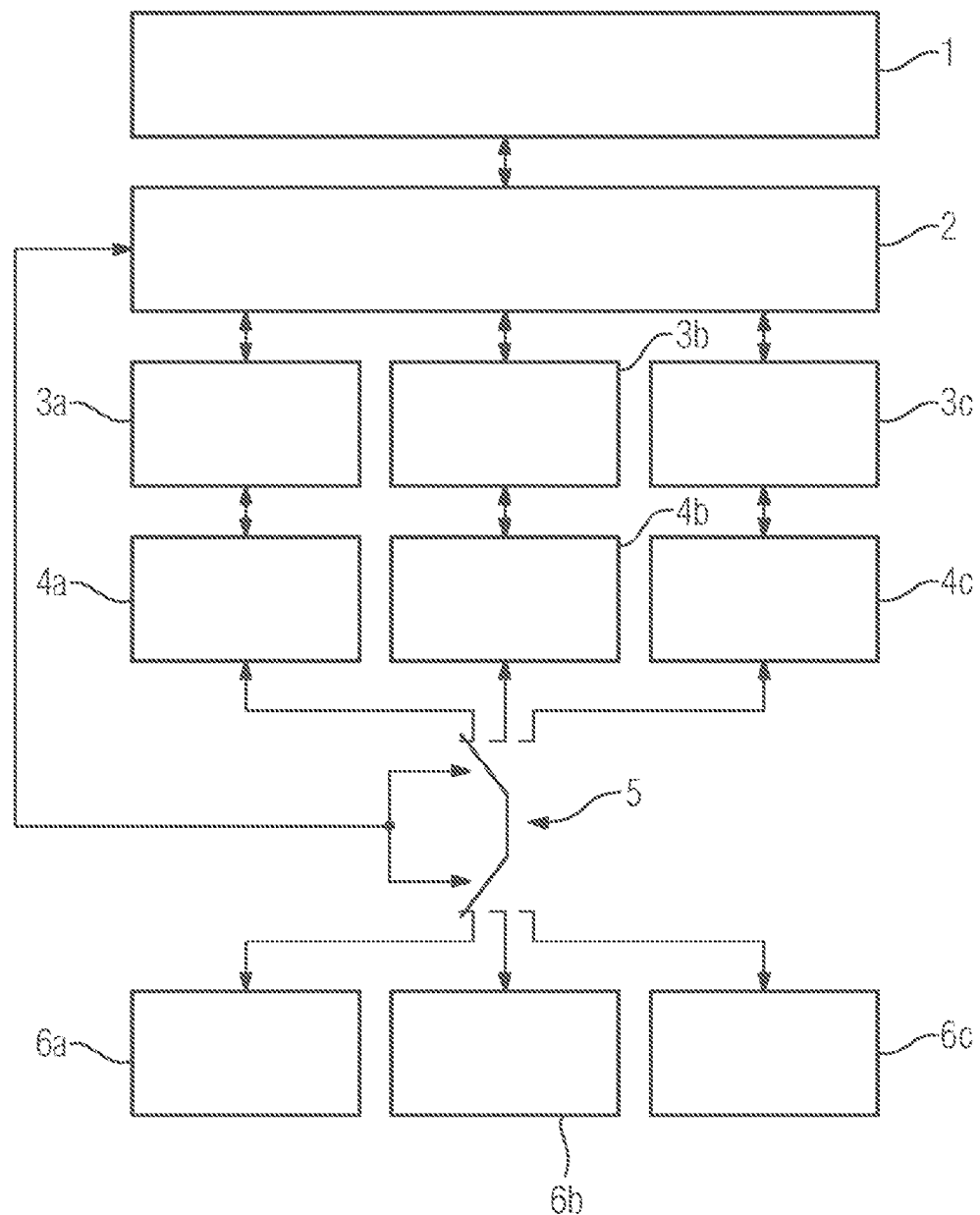

FIELD DEVICE

CROSS-REFERENCE TO RELATED APPLICATIONS

This application claims priority to EP Application No. 15150800.9 filed Jan. 12, 2015, the contents of which are hereby incorporated by reference in their entirety.

TECHNICAL FIELD

The present disclosure relates to field devices and, in particular, to field devices for safety and comfort applications and for power management. The present disclosure focuses on the communication functions of such devices.

BACKGROUND

Field devices as described in this disclosure may, for instance, be employed in room automation or in power management. These field devices may be arranged stand-alone or as an installation with several communicating units. Contemporary field devices provide controllers and actuators to manage a wide range of disciplines such as heating, ventilation, air conditioning, hazard detection, lighting, fan coils, and blinds.

A wide range of communication busses and protocols exist that provides communication functions in between field devices. Typically, wireless solutions such as WLAN, KNX® RF, and/or Enocean® are employed. Hard-wired solutions are also on the market. These frequently rely on Ethernet® cables or on KNX® cables. The choice of any particular wireless or hard-wired solution is also affected by bandwidth requirements. Devices with video streaming functionality may, for instance, require more bandwidth than other types of field devices.

In addition to these busses, the field devices may communicate using various protocols. There are cases where the devices of an installation rely on a single protocol such as KNX®, Modbus, LON or BACnet®. In addition, a number of proprietary protocols exist.

Installations exist with various field devices using different protocols. In order to ensure compatibility within an installation, installations with different protocols commonly harness converters. Converters are used to translate one protocol into to another protocol. Input/output modules (IO modules) are an alternative solution to be considered in conjunction with installations with different protocols. Input/output modules that translate between different protocols may actually come as part of a field device. A field device with a built-in input/output module thus lowers the number of independent devices and the overall complexity of an installation. Analogue busses may also be used to overcome compatibility issues. Analogue busses transfer signals in analogue form thereby eliminating the need to translate between digital protocols.

Converters, IO modules, and/or analogue busses frequently result in extra effort required for commissioning and/or for maintenance. Also, the use of converters, of IO modules, and/or of analogue busses typically involves cost penalties.

For configuration and/or for test purposes, field devices frequently comprise human-machine interfaces (HMIs). A human machine interface may either by fully implemented on a device. In this case, an operator may directly interact with the field device. To that end, field devices typically comprise displays and input functionalities such as buttons, keyboards, voice recognition etc. A field device may also implement an interface such that a communication channel is established between a (portable) computer and/or a handheld device and the field device. The interface may, by way of non-limiting example, be a RS-232 port, a RS-422 port, a RS485 port, a USB port, or similar. An operator may then enter data and read configurations through a portable computer and/or a handheld device.

SUMMARY

One embodiment provides a field device, in particular a field device of a room automation system or of a power management system or of a hazard detection system, comprising: at least one human-machine interface with at least one memory configured to store physical layer data, at least two protocol stacks configured to communicate with another device, wherein the field device provides a controller configured to select at least one protocol stack based on the physical layer data stored in the memory of the human-machine interface, wherein the field device further comprises at least two physical layer elements, and at least two compatible pairs, wherein each compatible pair comprises at least one physical layer element of the field device and at least one protocol stack of the field device, wherein the field device further comprises at least one selector switch configured to connect and to disconnect physical layer elements and protocol stacks, such that a physical layer element and a protocol stack connected or disconnected by the at least one selector switch belong to the same compatible pair.

In a further embodiment, the selector switch is configured to connect one compatible pair at a time, such that all compatible pairs other than the connected compatible pair are disconnected.

In a further embodiment, the field device comprises a number n of compatible pairs and wherein n is larger than one and wherein the selector switch is configured to connect and to disconnect each of the n compatible pairs.

In a further embodiment, the selector switch is configured to connect multiple compatible pairs at a time, such that all compatible pairs other than the compatible pairs connected by the selector switch are disconnected.

In a further embodiment, the field device comprises a number n of compatible pairs and wherein n is larger than one and wherein the selector switch is configured to connect a number m of multiple compatible pairs at a time and wherein m is larger than one and less than or equal to n, such that n over m configurations exist and/or are attainable.

In a further embodiment, at least one protocol stack comprises a driver configured for media access control.

In a further embodiment, at least one protocol stack comprises at least one driver configured to communicate with at least one physical layer element of the field device.

In a further embodiment, the at least one driver is configured to read and/or to write physical layer data stored in the memory of the human-machine interface in accordance with at least one communication protocol.

In a further embodiment, the at least one driver is configured to read and/or to write physical layer data stored in the memory of the human-machine interface in accordance with at least one communication protocol and wherein the at least one protocol is selected from KNX, Modbus, LON (local operating network) or BACnet.

In a further embodiment, the at least one driver is configured to read and/or to write physical layer data stored by the human-machine interface in accordance with at least one communication protocol and wherein the at least one protocol is a proprietary protocol.

In a further embodiment, the field device comprises at least one bus configured to connect at least one protocol stack of the field device to at least one memory of the human-machine interface.

In a further embodiment, the at least one bus is configured for uni-directional or for bi-directional data transfer.

In a further embodiment, the at least one bus is configured for parallel or for serial data transfer.

In a further embodiment, the field device provides at least one actuator configured to manage disciplines such as heating and/or ventilation and/or air conditioning and/or hazard detection and/or lighting and/or fan coils and/or blinds.

Another embodiment provides a room automation system with a field device as disclosed above.

BRIEF DESCRIPTION OF THE DRAWINGS

FIG. 1 shows a block diagram of an example field device according to one embodiment of the invention.

DETAILED DESCRIPTION

The present disclosure improves on installations with several communicating field devices. The present disclosure also aims at providing a field device that comprises with aforementioned components and meets the aforementioned requirements.

The present disclosure provides a field device which can communicate with a wide range of busses. A field device as per this disclosure is typically part of a network of devices such as a room automation system. It may also belong to a power management system or to an energy management system. Further applications of such field devices include but are not limited to hazard detection such as fire alarms and burglary.

The field device of this disclosure may use and connect to a wide range of busses. Busses may be used to connect to other field devices and/or to master devices and/or to client devices. The field device thus largely eliminates converters and/or analogue busses and/or (separate) input-output module. The field device thereby reduces the overall complexity of the network that it belongs to.

The field device of this disclosure may communicate to other field devices and/or to master devices and/or to client devices. In so doing, the field device of this disclosure may use a number of protocols. There may actually be more than one protocol available for any particular type of bus.

It is a related object of the present disclosure to provide a field device with actuators. It is a particular object of this disclosure that these actuators can manage a range of disciplines such as, by way of non-limiting example, heating and/or ventilation and/or air conditioning and/or hazard detection and/or lighting and/or fan coils and/or blinds. This list of disciplines is not exhaustive.

In other words, the present disclosure teaches a field device, wherein the field device provides at least one actuator configured to manage disciplines such as heating and/or ventilation and/or air conditioning and/or hazard detection and/or lighting and/or fan coils and/or blinds.

It is another object of the present disclosure to provide a field device that can connect to a network of devices by means of serial or parallel busses. It is a related object of the present disclosure to provide a field device that can connect to a network of devices by means of uni-directional or bi-directional busses.

It is another object of the present disclosure to provide a field device that communicates with other devices via a serial or a parallel protocol. It is a related object of the present disclosure to provide a field device that communicates with other devices via a uni-directional or a bi-directional protocol.

It is another object of the present disclosure to provide a field device with a selector switch, such that the field device can switch between various protocols and/or bus types and/or physical layers. It is a related object of the present disclosure to provide a field device with a selector switch configured to link protocol stacks to physical layers.

It is another related object of the present disclosure to provide a field device with a selector switch, such that any selection of a particular protocol stack and of a physical layer element is exclusive. That is, the selector switch is configured to connect only one compatible pair consisting of a protocol stack and of a physical layer element at a time.

It is another related object of the present disclosure to provide a field device with a selector switch, wherein the selection made by the selector switch is not exclusive. That is, the selector switch is configured to link multiple compatible pairs each consisting of a protocol stack and of a physical layer element at a time.

It is another related object of the present disclosure to provide a field device with a selector switch, such that the selector switch covers all of the possible configurations between protocol stacks and physical layers.

It is yet another object of the present disclosure to provide a field device with a driver for each or for at least one physical layer. Preferably, the driver shall have a media access control address.

As shown in FIG. 1, the present disclosure teaches a field device 1, wherein the at least one driver 4a, 4b, 4c is configured to read and/or to write physical layer data stored in the memory of the human-machine interface 1 in accordance with at least one communication protocol and wherein the at least one protocol is selected from KNX®, Modbus, LON (local operating network) or BACnet®.

The present disclosure also teaches a field device, wherein the at least one driver 4a, 4b, 4c is configured to read and/or to write physical layer data stored by the human-machine interface 1 in accordance with at least one communication protocol and wherein the at least one protocol is a proprietary protocol.

FIG. 1 shows a field device with a human-machine interface 1. A human-machine interface functions to provide an interface between an operator and the device. The human-machine interface of the field device of this disclosure preferably comprises a display with suitable resolution. Suitable resolutions include, but are not limited to 426×320 pixels, 470×320 pixels, 640×480 pixels, 960×720 pixels. In a preferred embodiment, the human-machine interface of this disclosure comprises a monochrome or a colour display. The display may be a liquid-crystal display. The display may also comprise organic light-emitting diodes. The human-machine interface preferably also provides input devices such as, by way of non-limiting examples, keyboards, buttons, touchscreens, capacitive touch-screens, voice recognition, track points etc. The human-machine interface further provides a memory such that physical layer data can be stored in the memory. The human-machine interface may also provide a memory controller for storing data, refreshment cycles of random access memory etc. Physical layer data include, but are not limited to, types of actuators and/or sensors, actuator and/or sensor settings, actuator and/or sensor configurations, diagnostic parameters etc. The memory may, by way of non-limiting example, be random access memory (RAM), read only memory (ROM), flash memory, EPROM memory, EEPROM memory, registers, a hard disk, a removable disk, or similar.

In an alternate embodiment, the human-machine interface of the field device comprises a memory, a controller, and a computer interface. External devices such as handheld computers, portable computers, mobile phones may connect to the human machine interface through the computer interface. The human machine interface thus stores and/or manages data, while communication with an operator is established through the external device.

In other words, the present disclosure teaches a field device with at least one human-machine interface with at least one memory configured to store physical layer data.

In a particular embodiment, the human-machine interface runs an operating system. The operating system may, for instance, be an Android® operating system, a Windows® operating system, or a Linux® operating system such as Meego® linux. The operating system may be a system specifically tailored for embedded systems and/or for human-machine interfaces. The operating system may also be general-purpose.

The field device of the present disclosure comprises at least two protocol stacks. FIG. 1 shows three protocol stacks 3a, 3b, 3c. The protocol stacks function to access physical layer data stored in the memory of the human-machine interface. The protocol stacks also allow the field device to communicate with other devices within a network by using a particular protocol. These protocols include, but are not limited to, KNX®, Modbus, LON (local operating network), or BACnet®. A protocol stack may actually be configured to handle multiple protocols. The protocol may also be proprietary.

In a particular embodiment, communication in amongst the field devices is encrypted. The field devices may employ both symmetric and asymmetric encryption. Field devices may actually follow a Diffie-Hellman procedure for exchange of cryptographic keys. The key lengths employed in symmetric or in asymmetric encryption will depend on the particular algorithm (such as 3DES, AES, blowfish, or similar) used by these devices. Cryptographic keys may, be way of non-limiting example, be 64 bits, 128 bits, 512 bits, 1024 bits, or 2048 bits long.

The protocol stack also allows the field device to communicate with other devices over a range of busses. These include, but are not limited to, BLUETOOTH®, WLAN, KNX® RF, and/or Enocean®. Hard-wired solutions are also envisaged.

These frequently rely on USB-cables, on Ethernet® cables, on KNX® cables or on (fibre) optical data transmission.

In other words, the present disclosure teaches a field device with least two protocol stacks configured to communicate with another device.

The field devices will come with suitable connectors for any hard-wired bus. Suitable connectors may be USB-connectors, Ethernet® connectors, connectors for (optical) fibres etc. The list of connectors is not exhaustive.

It is envisaged that the field device comprises a bus such that any protocol stack may communicate directly with the memory and/or indirectly via a memory controller of the human-machine interface. The bus may be either uni-directional or bi-directional. The bus may be serial or parallel, synchronous or asynchronous. While serial busses transfer one bit after another, parallel busses transfer several bits at a time. There may be separate busses for each protocol stack. In another embodiment, several protocol stacks share the same bus.

In other words, the present disclosure teaches a field device, wherein the field device comprises at least one bus configured to connect at least one protocol stack 3a, 3b, 3c of the field device to at least one memory of the human-machine interface 1.

The present disclosure also teaches a field device, wherein the field device comprises at least one bus configured to connect at least one protocol stack 3a, 3b, 3c of the field device to at least one memory of the human-machine interface 1 and wherein the at least one bus is configured for uni-directional or for bi-directional data transfer.

The present disclosure further teaches a field device as detailed above, wherein the at least one bus is configured for parallel or for serial data transfer.

A universal asynchronous receiver/transmitter (UART) may, for instance, connect a protocol stack to the memory. The protocol stack may actually be implemented as an integrated circuit. In a particular embodiment, the universal asynchronous receiver/transmitter is part of this integrated circuit. In an alternate embodiment, a proprietary bus connects the protocol stack to the memory. In yet another embodiment, the different (types of) busses are employed in between the protocol stacks and the memory.

At least one of the protocol stacks of the field device comprises a driver 4a, 4b, 4c. FIG. 1 depicts one driver for each protocol stack 3a, 3b, 3c. The driver may or may not come with a media access control (MAC) address as explained below. The driver functions to connect to a physical layer element of the field device. The driver is operative to convert (digitally encoded) signals entering the protocol stack into commands for an actuator or a sensor. A driver for the physical layer thus is the instance that may, by way of non-limiting example, command a (tangible) valve to open or to close. A driver for the physical layer element may, by way of another non-limiting example, open or close blinds. A driver for the physical layer element may, by way of yet another non-limiting example, read a resistance from a PT100 resistor of a thermometer.

In other words, the present disclosure teaches a field device comprising at least two physical layer elements 6a, 6b, 6c.

The present disclosure also teaches a field device, wherein at least one protocol stack 3a, 3b, 3c comprises a driver 4a, 4b, 4c configured for media access control.

The present disclosure further teaches a field device, wherein at least one protocol stack 3a, 3b, 3c comprises at least one driver 4a, 4b, 4c configured to communicate with at least one physical layer element 6a, 6b, 6c of the field device.

The present disclosure goes on to teach a field device, wherein the at least one driver 4a, 4b, 4c is configured to read and/or to write physical layer data stored in the memory of the human-machine interface 1 in accordance with at least one communication protocol.

At least one of the protocol stacks of the field device comprises a driver configured for media access control (MAC). Preferably, all of the protocol stacks of the field device comprise drivers configured for media access control. A driver suitable for MAC provides a MAC address. This address should be unique within the field device, if not globally. Typically, the MAC address of a driver is set during manufacture of a field device. It is envisaged that a driver provides multiple MAC addresses and that each of these MAC addresses is unique. In those cases the same driver accepts and/or initiates connections under multiple addresses.

The field device of the present disclosure achieves maximum flexibility and/or reduction of overall complexity through a selector switch 5. The selector switch 5 functions to connect protocol stacks 3a, 3b, 3c to physical layer elements 6a, 6b, 6c. The connection may be established directly or through a driver 4a, 4b, 4c. A protocol stack 3a, 3b, 3c and a physical layer may, for instance, connect directly and not through a driver 4a, 4b, 4c, if the physical layer element and the protocol stack (speak) use the same or compatible protocols. A digital thermometer may, by way of non-limiting example, directly connect to a protocol stack, such that no driver will be required in between the thermometer and the protocol stack.

In other words, the present disclosure teaches a field device comprising at least one selector switch 5 configured to connect and to disconnect physical layer elements 6a, 6b, 6c and protocol stacks 3a, 3b, 3c, such that a physical layer element 6a, 6b, 6c and a protocol stack 3a, 3b, 3c connected or disconnected by the at least one selector switch 5 belong to the same compatible pair Physical layer elements 6a, 6b, 6c may, by way of non-limiting example, be actuators. In a particular embodiment, the physical layer element may be a valve or a stepper motor with or without a controller. A sensor such as a thermometer may also form a physical layer element. Further, the physical layer element may supply energy through a battery or through a fuel cell. The physical layer element may, in particular, supply energy through a solid oxide fuel cell or through a polymer electrolyte membrane fuel cell or through a flow battery. Suitable flow batteries comprise, by way of non-limiting example, hydrogen-lithium bromated batteries, hydrogen-lithium chlorate batteries, bromine-hydrogen batteries, iron-tin batteries, iron-titanium batteries, iron-chrome batteries, vanadium-vanadium (sulphate) batteries, vanadium-vanadium (bromide) batteries, sodium-bromine polysulfide batteries, zinc-bromine batteries, lead-acid (methanesulfonate) batteries and/or zinc-cerium (methanesulfonate) batteries. Suitable flow batteries may also comprise organic flow batteries such as batteries based on quinones. None of the above lists is exhaustive.

In other words, the present disclosure teaches a field device wherein the field device provides at least one actuator and that actuator supplies energy through a (flow) battery or through a solid oxide fuel cell or through a polymer electrolyte fuel cell. The physical layer elements 6a, 6b, 6c may be part of a field device. In an alternate embodiment, the physical layer elements 6a, 6b, 6c are installed in the in the vicinity of a field device. In yet another embodiment, the physical layer elements 6a, 6b, 6c are installed in one building, whereas the field device is installed in another building. In yet another embodiment, the physical layer elements 6a, 6b, 6c and the field device are distributed throughout the various rooms (cellars, attics) of a commercial, residential and/or industrial building.

It is envisaged that physical layer elements come with analogue or with digital controllers. In a particular embodiment, a controller is a physical layer element.

The selector switch 5 also functions to break (disconnect) any of the connections between a protocol stack and a physical layer element 6a, 6b, 6c. In other words, physical layer elements and protocol stacks form compatible pairs. These compatible pairs may be connected or disconnected by the selector switch 5. FIG. 1 shows three physical layer elements 6a, 6b, 6c and three protocol stacks 3a, 3b, 3c. The arrangement according to FIG. 1 may thus provide three compatible pairs.

It is envisaged to provide a field device wherein the selector switch 5 covers all of the compatible pairs (3a, 6a), (3b, 6b), and (3c, 6c). A field device is also envisaged wherein these compatible pairs are exclusive. That is, if a compatible pair (3a, 6a) is connected, then the compatible pairs (3b, 6b) and (3c, 6c) will be disconnected. In other words, the selector switch 5 of this embodiment is configured to make and/or maintain one connection at a time.

In other words, the present disclosure teaches a field device wherein the selector switch 5 is configured to connect one compatible pair at a time, such that all compatible pairs other than the connected compatible pair are disconnected.

The present disclosure further teaches a field device wherein the field device comprises a number n of compatible pairs and wherein n is larger than one and wherein the selector switch 5 is configured to connect and to disconnect each of the n compatible pairs.

It is envisaged that the selector switch 5 may also connect multiple compatible pairs at a time. The selector switch 5 may, actually, connect protocol stack 3a to physical layer element 6a and at the same time protocol stack 3c to physical layer element 6c. This embodiment requires a selector switch 5 operative to make or break multiple connections on the protocol stack side and on the physical layer side.

In other words, the present disclosure teaches a field device, wherein the selector switch 5 is configured to connect multiple compatible pairs at a time, such that all compatible pairs other than the compatible pairs connected by the selector switch are disconnected.

In a particular embodiment, the selector switch 5 suitable for multiple connections covers the entire configuration space. That is, if there are n=3 compatible pairs and the selector switch makes m=2 connected compatible pairs at a n time, then there will be m=3 configurations. Likewise, in an arrangement with n=4 compatible pairs and m=2 connected compatible pairs at a time, there will be m=6 configurations.

In other words, the present disclosure teaches a field device, wherein the field device comprises a number n of compatible pairs and wherein n is larger than one and wherein the selector switch 5 is configured to connect a number m of multiple compatible pairs at a time and wherein m is larger than one and less than or equal to n, such that n over m configurations exist and/or are attainable.

The number of compatible pairs in FIG. 1 will actually be less than three if any protocol stack 3a, 3b, 3c is not suitable (compatible) for connection to a physical layer element 6a, 6b, 6c. The number of compatible pairs will exceed three compatible pairs if protocol stack 3a is suitable for connection to physical layer element 6b. The arrangement according to FIG. 1 actually has up to nine possible compatible pairs (3a, 6a), (3a, 6b), (3a, 6c), (3b, 6a) . . . of protocol stacks 3a, 3b, 3c and of physical layer elements 6a, 6b, 6c.

In other words, the present disclosure teaches a field device with at least two compatible pairs, wherein each compatible pair comprises at least one physical layer element of the field device and at least one protocol stack of the field device.

The field device of this disclosure is configured to select a protocol stack based on the physical layer data stored in the memory of the human-machine interface. It is envisaged that the human-machine interface provides a controller configured to read physical layer data and to decide on a communication protocol. It is also envisaged that a protocol stack is selected by a controller other than the controller of the human-machine interface 1. The controller may, by way of nonlimiting example, be a microcontroller, a central processing unit (CPU), a field programmable gate array (FPGA), an application-specific integrated circuit (ASIC), or similar. Generally, the field device selects a protocol stack. To that end, the field device employs any suitable controller preferably arranged within the field device.

In other words, the present disclosure teaches a field device with a controller configured to select at least one protocol stack based on the physical layer data stored in the memory of the human-machine interface.

It is also envisaged that the choice of the protocol stack 3a, 3b, 3c directly or indirectly affects the setting of the selector switch 5. In a particular embodiment, the controller which selects a protocol stack also controls the setting of the selector switch 5. That is, the controller switches between compatible pairs of protocol stacks and of physical layer elements through the selector switch 5. Ideally, the same controller selects a protocol stack and connects a compatible pair in accordance with its selection.

In an alternate embodiment, separate controllers are employed to set the selector switch 5 and to select a protocol stack 3a, 3b, 3c. In a specific embodiment, the selector switch 5 comprises a controller. If separate controllers are employed, then these controllers will preferably communicate with one another through a suitable bus/protocol.

It is envisaged that the separate controller runs an operating system. The operating system may, for instance, be an Android® operating system, a Windows® operating system, or a Linux® operating system such as Meego®. The operating system may be a system specifically tailored for embedded systems and/or for controllers for selector switches. The operating system may also be general-purpose.

The present disclosure further teaches a room automation system and/or a power management system and/or an energy management system and/or a total room automation system with a field device as per this disclosure.

Parts of the field device, especially the selector switch 5, or of a method according to the present disclosure may be embodied in hardware, in a software module executed by a processor, or in a cloud computer, or in a combination of these. The software may include a firmware, a hardware driver run in the operating system, or an application program. Thus, the disclosure also relates to a computer program product for performing the operations presented herein. If implemented in software, the functions described may be stored as one or more instructions on a computer-readable medium. Some examples of storage media that may be used include random access memory (RAM), magnetic RAM, read only memory (ROM), flash memory, EPROM memory, EEPROM memory, registers, a hard disk, a removable disk, other optical disks, a Millipede® device, or any available media that can be accessed by a computer or any other IT equipment and appliance.

It should be understood that the foregoing relates only to certain embodiments of the invention and that numerous changes may be made therein without departing from the scope of the invention as defined by the following claims. It should also be understood that the invention is not restricted to the illustrated embodiments and that various modifications can be made within the scope of the following claims.

REFERENCE NUMERALS 1 human-machine interface
2 physical layer data
3a, 3b, 3c Communication protocol stacks
4a, 4b, 4c (media access control) drivers for physical layers
5 selector switch
6a, 6b, 6c physical layer elements, part of the physical layer.

What is claimed is:

1. A field device of a room automation system or of a power management system or of a hazard detection system, the field device comprising:
at least one human-machine interface including at least one memory configured to store physical layer data;
at least two protocol stacks configured to communicate with another device;
a controller configured to select at least one protocol stack of the at least two protocol stacks based on the physical layer data stored in the memory of the human-machine interface;
at least two physical layer elements; and
a number n of compatible pairs, wherein n is larger than one;
wherein each compatible pair of the at least two compatible pairs comprises at least one physical layer element of the at least two physical layer elements and at least one protocol stack of the at least two protocol stacks; and
at least one selector switch configured to selectively connect and disconnect the physical layer elements and the protocol stacks, such that a physical layer element of the at least two physical layer elements and a protocol stack of the at least two protocol stacks connected or disconnected by the at least one selector switch belong to the same compatible pair;
wherein the selector switch is configured to connect a number m of the compatible pairs of the at least two compatible pairs at a time, such that all the compatible pairs other than the compatible pairs connected by the selector switch are disconnected; and
wherein m is larger than one and less than or equal to n, such that n over m configurations exist or are attainable.

2. The field device of claim 1, wherein the selector switch is configured to connect one compatible pair at a time, such that all compatible pairs other than the connected compatible pair are disconnected.

3. The field device of claim 2, wherein the field device comprises a number n of compatible pairs, wherein n is larger than one, and wherein the selector switch is configured to connect and disconnect each of the n compatible pairs.

4. The field device of claim 1, wherein at least one protocol stack of the at least two protocol stacks comprises a driver configured for media access control.

5. The field device of claim 4, wherein the at least one driver is configured to read and/or write the physical layer data stored in the memory of the human-machine interface in accordance with at least one communication protocol.

6. The field device of claim 5, wherein the at least one driver is configured to read and/or write the physical layer data stored in the memory of the human-machine interface in accordance with at least one communication protocol selected from the group consisting of KNX, Modbus, LON (local operating network), and BACnet.

7. The field device of claim 5, wherein the at least one driver is configured to read and/or write the physical layer data stored by the human-machine interface in accordance with at least one proprietary communication protocol.

8. The field device of claim 1, wherein at least one protocol stack of the at least two protocol stacks comprises at least one driver configured to communicate with at least one physical layer element of the at least two physical layer elements.

9. The field device of claim 1, wherein the field device comprises at least one bus configured to connect at least one protocol stack of the at least two protocol stacks to the at least one memory.

10. The field device of claim 9, wherein the at least one bus is configured for uni-directional or bi-directional data transfer.

11. The field device of claim 9, wherein the at least one bus is configured for parallel or serial data transfer.

12. The field device of claim 1, wherein the field device provides at least one actuator configured to manage disciplines such as heating, ventilation, air conditioning, hazard detection, lighting, fan coils, or blinds.

13. A room automation system, comprising
a field device comprising:
at least one human-machine interface including at least one memory configured to store physical layer data;
at least two protocol stacks configured to communicate with another device;
a controller configured to select at least one protocol stack of the at least two protocol stacks based on the physical layer data stored in the memory of the human-machine interface;
at least two physical layer elements; and
a number n of compatible pairs, wherein n is larger than one;

each compatible pair of the at least two compatible pairs comprises at least one physical layer element of the at least two physical layer elements and at least one protocol stack of the at least two protocol stacks; and at least one selector switch configured to selectively connect and disconnect the physical layer elements and the protocol stacks, such that a physical layer element of the at least two physical layer stacks and a protocol stack of the at least two protocol stacks connected or disconnected by the at least one selector switch belong to the same compatible pair;

wherein the selector switch is configured to connect a number m of the compatible pairs of the at least two compatible pairs at a time, such that all the compatible pairs other than the compatible pairs connected by the selector switch are disconnected; and wherein m is larger than one and less than or equal to n, such that n over m configurations exist or are attainable.

* * * * *